Aug. 26, 1958  S. R. PARKER ET AL  2,849,606
AMPLITUDE COMPARISON CIRCUIT
Filed March 25, 1953
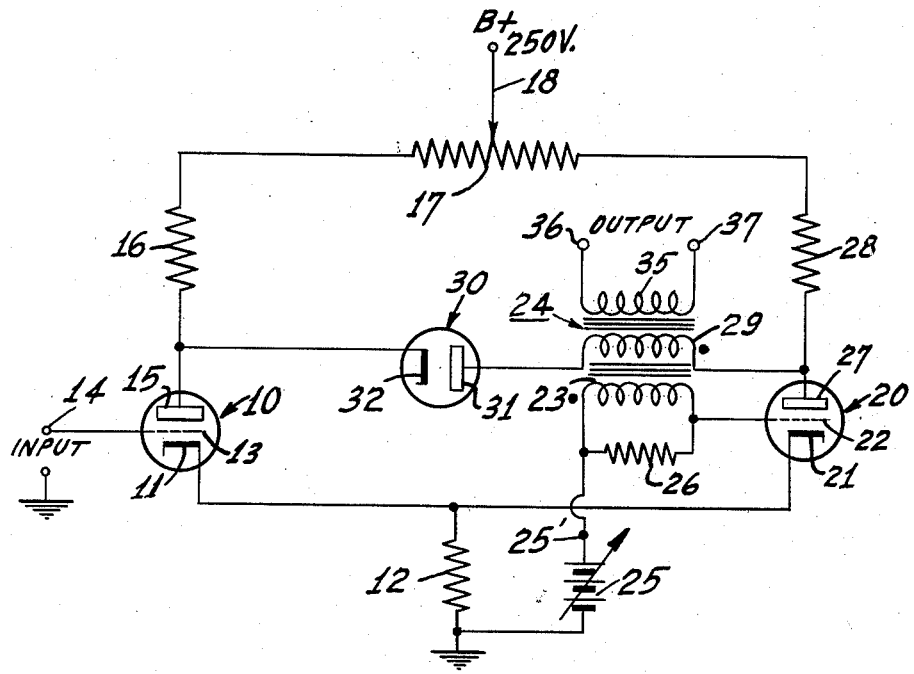
INVENTORS
SYDNEY R. PARKER AND
EDWARD FISCHER
BY Charles H. Brown
ATTORNEY

United States Patent Office 2,849,606
Patented Aug. 26, 1958

2,849,606

AMPLITUDE COMPARISON CIRCUIT

Sydney R. Parker, Pitman, N. J., and Edward Fischer, Lancaster, Pa., assignors, by mesne assignments, to the United States of America as represented by the Secretary of the Navy Application March 25, 1953, Serial No. 344,595

7 Claims. (Cl. 250—27)

This invention relates to an amplitude comparison circuit operative to generate an output pulse whenever a predetermined relationship exists between the amplitudes of two input voltages.

The invention is useful in a variety of applications. One input voltage may be an accurately known reference voltage from a D.-C. source, and the other input voltage may be a signal which periodically varies in amplitude. An output pulse is generated every time the amplitude of the varying signal equals the amplitude of the reference voltage. Such a result is often desired in complex electronic systems such as radar and computer systems. The invention is also useful in test equipment for calibrating the voltage-time and linearity characteristics of waves such as sawtooth waves.

It is an object of this invention to provide an improved system for generating an output pulse when two instantaneous voltages are in a predetermined relationship with each other.

It is another object to compare the amplitudes of two voltages with a very high degree of accuracy.

It is another object to provide an improved voltage amplitude comparison circuit which does not load or otherwise disturb the sources of voltage.

It is a further object to provide a voltage comparing device which is very sensitive by reason of utilizing the gain or amplifying characteristic of vacuum tubes.

In one aspect the invention comprises a pair of intercoupled vacuum tubes or electron discharge devices having a common cathode resistor. A varying voltage is applied to the grid of one tube and a reference voltage is applied through a winding of a pulse transformer to the grid of the other tube. A diode and a second winding of the pulse transformer are connected in series between the plates of the two tubes. When the varying voltage equals the reference voltage, a regenerative pulse flows in the windings of the pulse transformer and an output pulse may be obtained from a tertiary winding of the transformer.

Other objects, advantages and aspects of the invention will be apparent to those skilled in the art from the following more detailed description taken together with the appended drawing showing a circuit diagram of a presently preferred form of the invention.

In the drawing, a triode vacuum tube 10 has a cathode 11 connected through a cathode resistor 12 to ground, a grid 13 connected to input terminal 14, and a plate 15 connected through a load resistor 16 to one end of a potentiometer 17. Potentiometer 17 has a tap 18 connected to the positive terminal B+ of a source of unidirectional potential (not shown). The negative terminal of the source is connected to ground. A second triode vacuum tube 20 has a cathode 21 also connected through cathode resistor 12 to ground. A grid 22 of tube 20 is connected through the secondary winding 23 of a pulse transformer 24 and a source 25 of reference potential to ground. A damping resistor 26 is connected across winding 23. The plate 27 of tube 20 is connected through load resistor 28 to the other end of potentiometer 17. The plate 27 of tube 20 is connected through a primary winding 29 of pulse transformer 24 in series with a diode 30 to the plate 15 of tube 10. Diode 30 has a plate 31 and cathode 32. A tertiary winding 35 of pulse transformer 24 is connected to output terminals 36 and 37.

Initially, the tap 18 on potentiometer 17 is adjusted so that when a voltage equal to the potential of source 25 is applied between terminal 14 and ground, the potentials on the plates 15 and 27 of tubes 10 and 20, respectively, are exactly equal.

So long as the input voltage applied through input terminal 14 to grid 13 is less than the reference voltage applied to grid 22 from reference source 25, tube 10 conducts less than tube 20 and the potential at the plate 15 of tube 10 (and hence on the cathode 32 of diode 30) is higher than the potential at the plate 27 of tube 20. Therefore, no current can flow through diode 30 and primary winding 29 of pulse transformer 24. The moment the input voltage on grid 13 exceeds the reference voltage, the voltage on plate 15 drops slightly below the voltage on plate 27 and current starts to flow from plate 27 through winding 29 and diode 30 to plate 15. The winding 23 of pulse transformer 24 is poled so that the current flowing through winding 29 causes a decreased voltage to be developed on the end of winding 23 connected to grid 22. This decreased voltage on the grid 22 reduces the current flowing through tube 20 and increases the potential on plate 27, as a result of which the current flowing through winding 29 and diode 30 is increased and the potential at the end of winding 23 connected to grid 22 is further reduced. The regenerative cycle continues until tube 20 is cut off and the potential at the plate 27 cannot further increase. Then the magnetic field around the windings collapses inducing a positive voltage at the end of winding 23 connected to grid 22 which returns tube 20 to its normal conducting condition. Damping resistor 26 damps out oscillations in winding 23 that would otherwise result following the pulse of current through the winding. An output pulse is induced in tertiary winding 35 and is available for utilization from output terminals 36 and 37. The output pulse will be positive or negative depending on whether terminal 36 or terminal 37 of output winding 35 is grounded.

It should be understood that the tap 18 on potentiometer 17 may be moved to cause the system to generate an output pulse within a wide range of relative values of input signal and reference voltage.

If the input voltage applied to terminal 14 is a sawtooth wave which increases from a value lower than the reference voltage to a value higher than the value of the reference voltage from source 25, a single pulse is generated at output terminals 36 and 37 at the instant the voltage of the sawtooth wave slightly exceeds the reference voltage. The shape of the pulse is determined by the pulse transformer 24 and the damping resistor 26. The pulse transformer may be one of the commercially available types which have been extensively used in blocking oscillators. A smaller single pulse of opposite polarity is generated when the input voltage decreases to a value slightly below that of the reference voltage of source 25.

Solely by way of giving an example, a sawtooth wave sweeping from zero to 50 volts in a period of 300 microseconds was applied to the input terminals of a circuit as shown in the drawing wherein the circuit components had the following values:

| | | |
|---|---|---|
| Resistor 12 | ohms | 2,200 |
| Resistors 16 and 28 | do | 10,000 |
| Potentiometer 17 | do | 10,000 |

| | |
|---|---|
| Source B+ _____ volts__ | 250 |
| Source 25 _____ do____ | 25 |

A large sharp pulse having a duration of a fraction of a microsecond was generated at the instant that the input sawtooth wave increased to the value of 25 volts. A smaller pulse of opposite polarity was generated at the instant the input sawtooth wave decreased in voltage to 25 volts.

The source 25 may be adjusted to provide for the generation of a pulse at any desired reference voltage. In another application of the invention, two continuously varying signals can be applied to the circuit, one being applied between terminal 14 and ground, and the other being applied in place of battery 25 between terminal 25' and ground. An output pulse is then generated every time the voltage applied to terminal 14 equals the voltage applied to terminal 25'.

What is claimed is:

1. An amplitude comparison circuit comprising first and second electron discharge devices having input and output electrodes, means to apply voltages to be compared to the input electrodes of said devices, a pulse transformer having a plurality of coupled windings, a first winding of said transformer and a diode connected in series between the output electrodes of said devices, and a second winding of said transformer coupled to the input electrode of one of said devices and so poled that the flow of current thru said first winding causes a reduction of current flow thru said one device.

2. A pulse generator operative when two input voltages are equal, comprising, first and second electron discharge devices having input and output electrodes, a pulse transformer having at least two windings, a diode and one of said windings connected in series between the output electrodes of said devices, a second winding of said transformer and a source of input voltage connected in series to the input electrode of the first of said devices, and a second source of input voltage connected to the input electrode of the second of said devices.

3. A voltage amplitude comparison circuit comprising two vacuum tubes having cathode, grid and plate electrodes, a common cathode resistor connected between said cathodes and ground, a source of unidirectional potential, load resistors connected from said plates to said source, a pulse transformer including three windings, a diode and one of said windings connected between the plates of said tubes, a source of reference voltage and a second of said windings connected in series between the grid of one tube and ground, means to apply a varying voltage to the grid of the other tube, whereby an output pulse is available from the third winding of said transformer.

4. An amplitude comparator comprising, first and second vacuum tubes, each tube including cathode and grid and plate electrodes, a voltage-dividing resistance network connecting together said plate electrodes, a source of unidirectional potential connected to a point intermediate said resistance network, a common resistor connecting said cathode electrodes to ground, a pulse transformer including first and second and third windings, a diode and the first of said windings connected serially between said plate electrodes and in shunt relationship to said voltage-dividing network, a source of reference voltage, means connecting said reference voltage source and said second winding in series between the grid electrode of said first tube and ground, a damping resistor connected in shunt across said second winding, a source of varying input voltage, means applying said varying input voltage to said grid electrode of said second tube, and means to derive output pulses from said third winding.

5. A circuit as defined in claim 4 wherein said source of reference voltage comprises a source of unidirectional potential having a positive terminal connected to the grid electrode of said first tube.

6. A circuit as defined in claim 4 wherein said source of reference voltage comprises a source of alternating potential.

7. An amplitude comparator comprising, first and second vacuum tubes, each tube including cathode and grid and plate electrodes, a voltage-dividing resistance network connecting together said plate electrodes, a source of unidirectional potential connected to a point intermediate said resistance network, a common resistor connecting said cathode electrodes to ground, a pulse transformer including first and second and third windings, a diode and the first of said windings connected serially between said plate electrodes and in shunt relationship to said voltage-dividing network, a source of reference voltage, means connecting said reference voltage source and said second winding in series between the grid electrode of said first tube and ground, a damping resistor connected in shunt across said second winding, a source of varying input voltage, means applying said varying input voltage to said grid electrode of said second tube, said first and second windings and said source of reference voltage being so poled that an increase in current in said first winding causes a decrease in current in said first tube.

References Cited in the file of this patent

UNITED STATES PATENTS

| | | |
|---|---|---|
| 2,233,596 | Faudell | Mar. 4, 1941 |
| 2,265,620 | Bahring | Dec. 9, 1941 |
| 2,441,418 | Houghton | May 11, 1948 |
| 2,470,573 | Moore | May 17, 1949 |
| 2,619,632 | Krumhansl et al. | Nov. 25, 1952 |
| 2,674,691 | Krulikoski et al. | Apr. 6, 1954 |
| 2,695,953 | Seabury | Nov. 30, 1954 |
| 2,721,899 | Krumhansl et al. | Oct. 25, 1955 |
| 2,726,329 | Henderson | Dec. 6, 1955 |
| 2,763,721 | Hansell et al. | Sept. 18, 1956 |
| 2,778,978 | Drew | Jan. 22, 1957 |